United States Patent
Popoff et al.

[11] 3,758,567
[45] Sept. 11, 1973

[54] FLUOROSULFONATED THIOPHENOLS AND METHOD OF PREPARATION

[75] Inventors: Ivan Christoff Popoff, Ambler; Chandrakant Bhagwandas Thanawalla, Norristown, both of Pa.

[73] Assignee: Pennwalt Corporation, Philadelphia, Pa.

[22] Filed: June 21, 1971

[21] Appl. No.: 155,360

[52] U.S. Cl. .................. 260/543 F, 71/72, 71/103, 260/516
[51] Int. Cl. ............... C07c 149/40, C07c 149/42, C07c 149/39
[58] Field of Search ......................... 260/543 F, 516

[56] References Cited
UNITED STATES PATENTS
3,453,099  7/1969  Popoff et al..................... 260/543 F OTHER PUBLICATIONS
Popoff et al. "J. AG. Food Chem." Vol. 20, No. 1 (1972) pp. 80–82

*Primary Examiner*—Lorraine A. Weinberger
*Assistant Examiner*—Richard D. Kelly
*Attorney*—Stanley Litz

[57] ABSTRACT

A fluorosulfonated thiophenol

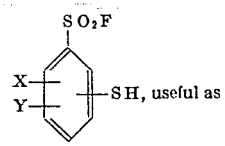

a plant response agent, and a process for its preparation are provided.

11 Claims, No Drawings

FLUOROSULFONATED THIOPHENOLS AND METHOD OF PREPARATION

This invention relates to new fluorosulfonated thiophenols and a novel process for their preparation, said compounds being active plant response agents.

The fluorosulfonated thiophenol of this invention is represented by the structure

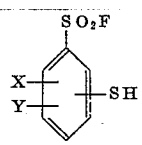

where X and Y are independently selected from the group consisting of hydrogen, Cl, F, $NO_2$, alkyl having one to eight carbon atoms, COOH, $NH_2$ NHR, $NR_2$ and OR where R is alkyl having one to eight carbon atoms.

The fluorosulfonated thiophenol is prepared by hydrolysis of the fluorosulfonated thiolocarbamate

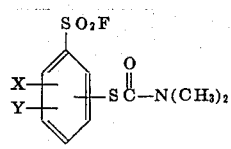

in aqueous sulfuric acid. The thiolocarbamate starting materials are obtained by the reation of a fluorosulfonated phenol with N,N-dimethylthiocarbamyl chloride, $(CH_3)_2NC(S)Cl$, in the presence of an acid acceptor, followed by thermal rearrangement of the resulting thionocarbamate as shown by the following reaction sequence.

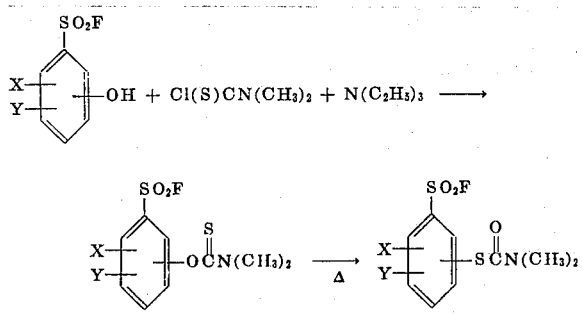

Fluorosulfonated phenols are known and recognized as effective plant response agents. (Popoff and Whitaker, U.S. Pat. No. 3,453,099, July 1, 1969). Fluorosulfonated phenols can be prepared easily and economically in excellent yields by fluorosulfonation of phenols. This method, however, is not applicable for the preparation of thiophenols because the fluorosulfonation of thiophenols gives disulfides. It is known also that isothiouronium compounds can be converted to thiols by alkaline hydrolysis. This method cannot be used, however, for the preparation of fluorosulfonated thiophenols because the $-SO_2F$ group is also hydrolyzed and converted to $-SO_2OH$. In addition, it is known that the $-SO_2F$ group can hydrolyze not only under alkaline conditions but also under acid conditions. Accordingly, it was surprising to discover reaction conditions under which the $SC(O)NMe_2$ group is hydrolyzed to $-SH$ but the $SO_2F$ group is not converted to $SO_2OH$ and, moreover, conditions under which the newly formed -SH is not oxidized to disulfide (Ar-S-S-Ar) at any appreciable rate.

In accordance with this invention, the new fluorosulfonated phenols as above depicted are prepared by hydrolysis of the above-described fluorosulfonated thiolocarbamates in about 60 to 95 percent (preferably 75–88 percent $H_2SO_4$) aqueous sulfuric acid at temperatures within the range of about 40°C. to 110°C. The weight ratio of the aqueous acid to the thiolocarbamate will in general range from about 1:0.5 to 1:5, and preferably 1:2 to 1:3. The extent of hydrolysis and its rate can be followed by the amount of gas ($CO_2$) evolved. After reaction is substantially complete, the reaction mixture is cooled and filtered, and the filter cake is washed with water to isolate the thiophenol usually in yields of 70 to 95 percent and reasonably pure. If additional purification is desired, it can be easily achieved by recrystallization. If the product is an oil, the cooled reaction mixture is poured into crushed ice and extracted with a solvent such as dichloromethane. Work up of the solvent extract gives the desired thiophenol.

The procedures for synthesizing exemplary compounds of this invention is next described in more detail. The structures of the synthesized compounds were verified by elemental analyses and infrared spectra.

EXAMPLE 1

2-Chloro-4-fluorosulfonylthiophenol

A suspension of 10.0 g. (0.0335 mole) of 2-chloro-S-(N,N-dimethylcarbamyl)-4-fluorosulfonylthiophenol in 20 ml. of 80 percent (v/v) aqueous sulfuric acid was heated at 55°–60°C. for 18 hr. The reaction mixture was cooled and filtered. The filter cake was washed thoroughly with water, dried and recrystallized from petroleum ether (b.p. 30°–60°) to give 5.5 g. (70 percent conversion) of a white crystalline solid m.p. 52.5°–55°. IR confirmed the structure

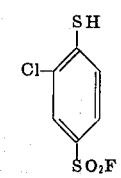

Analysis:

| % | Found | Calculated |
|---|---|---|
| C | 31.89 | 31.79 |
| H | 1.84 | 1.77 |
| F | 8.48 | 8.38 |
| S | 28.12 | 28.29 |

EXAMPLE 2

2,6-Dichloro-4-fluorosulfonylthiophenol

A suspension of 12.5 g. (37.6 mmoles) of 2,6-dichloro-S-(N,N-dimethylcarbamyl)-4-fluorosulfonylthiophenol in 25 ml. of 80 percent (v/v) aqueous sulfuric acid was heated at 50°–55° for 24 hr. The reaction was cooled and filtered. The filter cake was washed thoroughly with water and dried to give 9.38 g. (95.5 percent conversion) of the light-yellow product, m.p. 71°–72°.

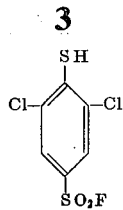

Analysis:

| % | Found | Calculated |
|---|---|---|
| C | 27.66 | 27.59 |
| H | 1.23 | 1.15 |
| F | 7.22 | 7.27 |

EXAMPLE 3

2,5-Dichloro-4-fluorosulfonylthiophenol

A suspension of 14.95 g. (0.045 mole) of 2,5-dichloro-S-(N,N-dimethylcarbamyl)-4-fluorosulfonyl-thiophenol in 30 ml of 80 percent (v/v) aqueous sulfuric acid was heated at 50°–55° to 24 hr. The reaction was cooled and filtered. The filter cake was washed thoroughly with water and dried to give 11.05 g. (94 percent conversion) of the light-yellow product, m.p. 92°–93°.

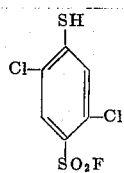

Analysis:

| % | Found | Calculated |
|---|---|---|
| C | 27.74 | 27.59 |
| H | 1.29 | 1.15 |
| F | 7.12 | 7.27 |

EXAMPLE 4

2-Chloro-4-fluorosulfonyl-6-nitrothiophenol

A suspension of 10.5 g. (0.03 mole) of 2-chloro-S-(N,N-dimethylcarbamyl)-4-fluorosulfonyl-6-nitrothiophenol in 21.0 ml of 80 percent (v/v) aqueous sulfuric acid was heated at 50°–55° for 18 hr. The reaction mixture was cooled and filtered. The filter cake was washed thoroughly with cold water and dried to give 7.9 g. of a yellow powder as the crude product. Additional 0.11 g. of the crude product was obtained from the sulfuric acid mother liquor by dilution with water. Extraction of the combined crude product with petroleum ether (b.p. 30°–60°) gave 7.92 g. (95 percent conversion) of a yellow, crystalline product, m.p. 70.5°–72°.

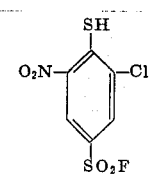

Analysis:

| % | Found | Calculated |
|---|---|---|
| C | 26.95 | 26.52 |
| H | 1.36 | 1.11 |
| F | 7.18 | 6.99 |
| S | 22.98 | 23.60 |

EXAMPLE 5

4-Fluorosulfonyl-2-nitrothiophenol

A suspension of 15.0 g. (0.0485 mole) of S-(N,N-dimethylcarbamyl)-4-fluorosulfonyl-2-nitrothiophenol in 30 ml of 80 percent (v/v) aqueous sulfuric acid was heated for 18 hr. at 50°–55°. The reaction mixture was cooled and filtered. The filter cake was washed thoroughly with water, dried, and extracted with boiling hexane. Evaporation of the hexane extracts gave 8.26 g. (72 percent conversion) of the product, m.p. 83.5°–87.5°. IR confirmed the structure.

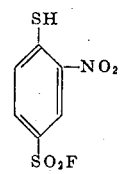

Analysis:

| % | Found | Calculated |
|---|---|---|
| C | 30.78 | 30.37 |
| H | 1.82 | 1.69 |
| F | 8.46 | 8.00 |
| S | 26.95 | 27.03 |

EXAMPLE 6

2-Fluoro-4-fluorosulfonylthiophenol, crude (I)

A suspension of 14.7 g. (0.052 mole) of 2-fluoro-S-(N,N-dimethylcarbamyl)-4-fluorosulfonylthiophenol in 30 ml of 80 percent (v/v) aq. sulfuric acid was heated in an oil bath maintained at 55°–60° for 14 hrs. At the end of this period, very little, if any, gas evolved. The reaction was poured into ice and extracted with chloroform. The chloroform extract was washed with cold water, dried over sodium sulfate and evaporated to give a mushy solid. The latter, on repeated extraction with hot hexane followed by evaporation of the hexane extracts, gave 5.48 (47.5 percent conversion) of the crude oily product. The hexane-insoluble product contained the disulfide. The analysis was carried out on the crude oily sample that was dried under reduced pressure over phosphorus pentoxide for 2 hrs. since attempts to purify the oil resulted in partial oxidation to the disulfide (II). IR confirms the structures.

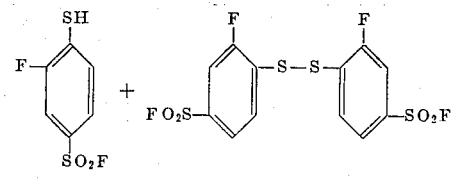

Analysis:

| % | Found | Calculated |
|---|---|---|
| C | 34.29 | 34.28 |
| H | 2.27 | 1.91 |
| S (total) | 29.82 | 30.50 |
| S (as-SH) | 11.07 | 15.25 |

EXAMPLE 7

2-Chloro-4-fluorosulfonyl-6-methylthiophenol.

A suspension of 15.6 g. (0.05 mole) of 2-chloro-S-(N,N-dimethyl-carbamyl)-4-fluorosulfonyl-6- methylthiophenol(m.p. 118.5°–120.5°) in 32 ml. of 80 percent (v/v) aq. sulfuric acid was heated in an oil bath at 75°–85° for 1.5 hr. The reaction mixture was cooled and filtered. The filter cake was powdered, washed thoroughly with cold water, dried, and recrystallized from hexane to give 8.12 g. (67 percent conversion) of a white crystalline solid, m.p. 68°–70°. Additional 3.25 g. (27 percent conversion) of a light yellow product, m.p. 68.5°–70°, was obtained from the mother liquor. Both crops showed identical IR spectra, which confirmed the structure.

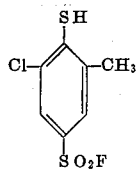

Analysis:

| % | Found | Calculated |
|---|---|---|
| C | 35.23 | 34.93 |
| H | 2.66 | 2.51 |
| F | 7.60 | 7.89 |
| S | 26.65 | 26.64 (total S) |
| S | 13.49 | 13.32 (S as —SH) |

EXAMPLE 8

2,3-Dichloro-4-fluorosulfonylthiophenol

A suspension of 15.0 g. (0.045 mole) of 2,3-dichloro-S-(N,N-dimethylcarbamyl)-4-fluorosulfonylthiophenol (m.p. 107°–108.5°) in 30 ml. of 80 percent (v/v) aq. sulfuric acid was heated in an oil bath at 75°–80° for 2.5 hr. The reaction mixture was cooled and filtered. The filter cake was powdered, washed thoroughly with cold water, and dried to give 11.2 g. (95.5 percent conversion) of a white crystalline solid, m.p. 53°–55°. Recrystallization from hexane raised the melting point to 55°–56°. IR confirms the structure of the compound.

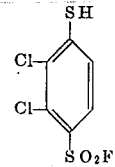

Analysis:

| % | Found | Calculated |
|---|---|---|
| C | 27.60 | 27.59 |
| H | 1.32 | 1.15 |
| Total S | 24.84 | 24.55 |
| S(as thiol) | 11.89 | 12.27 |

EXAMPLE 9

2,3-Dichloro-6-fluorosulfonylthiophenol, crude.

A suspension of 16.5 g. (0.05 mole) of 2,3-dichloro-S-(N,N-dimethyl-carbamyl)-6-fluorosulfonylthiophenol (m.p. 135°–139.5°) in 30 ml of 80 percent (v/v)aq. sulfuric acid was heated in an oil bath at 70°–75° for 2.25 hr. The reaction mixture was poured into ice-water and filtered. The filter cake was washed with cold water, dried, and recrystallized from n-hexane to give 7.27 g. (56 percent conversion) of a light yellow solid, m.p. 56(s), 58°–62°. On the basis of the C and S analyses, the product is contaminated with ca. 15 percent of unreacted starting material. IR confirms the structure (I) and the nature of the contaminant [C(O)N– at 5.9μ)].

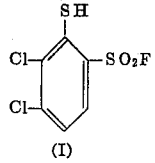

Analysis:

| % | Found | Calculated |
|---|---|---|
| C | 28.45 | 27.59 |
| H | 1.58 | 1.15 |
| F | 7.54 | 7.29 |
| S | 23.36 | 24.55 |

EXAMPLE 10

4-Chloro-2-fluorosulfonyl-5-methylthiophenol, crude (I)

A suspension of 15.6 g. (0.05 mole) of 4-chloro-S-(N,N-dimethylcarbamyl)-2-fluorosulfonyl-5-methylthiophenol in 32 ml. of 80 percent (v/v) aq. sulfuric acid was heated in an oil bath at 70°–75° for 2.25 hr. At the end of this period very little, if any, gas evolved. The reaction mixture was poured into ice and extracted with dichloromethane. The dichloromethane extract was washed with cold water, dried over sodium sulfate and evaporated to give a semisolid. The latter was filtered and the filter cake was washed with n-hexane. The filter cake contained the disulfide. The filtrate was evaporated under reduced pressure to give 8.0 g. (66.5 percent conversion) of a light yellow oil, the thiophenol, (I). The analysis was carried out on the crude sample, since attempts to purify the oil resulted in partial oxidation to the disulfide (II). IR confirms the structures.

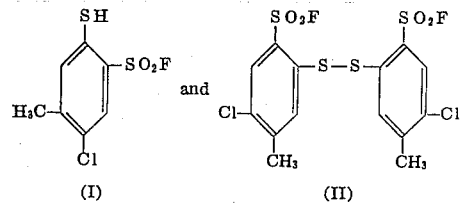

Analysis:

| % | Found | Calculated |
|---|---|---|
| C | 35.87 | 34.93 |
| H | 2.81 | 2.51 |
| F | 7.19 | 7.89 |
| S(—SH) | 10.66 | 13.32 |

The fluorosulfonated thiophenols of this invention are useful in the agricultural chemicals field as herbicides, desiccants and defoliants when applied in the conventional manner of application at dose rates within the range of about 0.1 to 1 lb/acre, and are especially useful as plant response agents when applied to such plants as black Valentine beans, soybeans, beans, oats and rice as desiccants. The fluorosulfonated thiophenols have a higher acidity in aqueous medium such that their dissociation constants (pKa) are about 3.5 units less than those of their corresponding oxygen analogs (the fluorosulfonated phenols described in U.S. Pat. No. 3,453,099), which property allows them to perform better in systems in which a strongly acidic modified phenol-type structure is needed.

In contrast to the fluorosulfonated phenols, the thiophenols of this invention are reducing agents; when reduced they are converted to disulfides which are sulfur donors and useful as specialty vulcanizing agents. In combination with alkyl mercaptans the thiophenols are useful chain transfer agents (molecular weight modifiers) in polymerizations of conjugated dienetype synthetic rubbers.

We claim:

1. A fluorosulfonated thiophenol of the formula

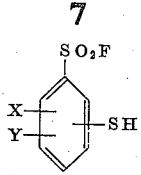

where X and Y are independently selected from the group consisting of hydrogen, Cl, F, NO$_2$, alkyl having one to eight carbon atoms, COOH, and OR where R is alkyl having one to eight carbon atoms, provided that at least one of X and Y is not hydrogen.

2. A compound according to claim 1 wherein X is hydrogen and Y is chlorine.
3. A compound according to claim 1 wherein X and Y are each chlorine.
4. A compound according to claim 1 wherein X is chlorine and Y is NO$_2$.
5. A compound according to claim 1 wherein X is hydrogen and Y is NO$_2$.
6. A compound according to claim 1 wherein X is hydrogen and Y is fluorine.
7. A compound according to claim 1 wherein X is chlorine and Y is methyl.
8. A compound according to claim 1 wherein X is fluorine and Y is methyl.
9. A method of preparing a fluorosulfonated thiophenol of the formula

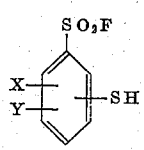

where X and Y are independently selected from the group consisting of hydrogen, Cl, F, NO$_2$, alkyl having one to eight carbon atoms, COOH, and OR where R is alkyl having one to eight carbon atoms, provided that at least one of X and Y is not hydrogen, which comprises hydrolyzing a fluorosulfonated thiolocarbamate of the formula

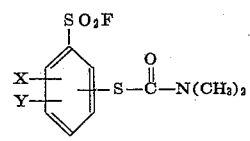

with aqueous sulfuric acid of about 60 to 95 percent concentration at a temperature within the range of about 40°C. to 110°C., the weight ratio of the aqueous sulfuric acid to the thiolocarbamate being from about 1:0.5 to 1:5.

10. A method in accordance with claim 9 wherein the aqueous sulfuric acid concentration is about 75 to 88 percent.
11. A method in accordance with claim 10 wherein the ratio of aqueous sulfuric acid to the thiolocarbamate is from 1:2 to 1:3.

* * * * *